US012803792B2

(12) United States Patent
Liu

(10) Patent No.: US 12,803,792 B2
(45) Date of Patent: Nov. 17, 2026

(54) SHARING KEYS WITH AUTHORIZED USERS

(71) Applicant: Micron Technology, Inc., Boise, ID (US)

(72) Inventor: Zhan Liu, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 89 days.

(21) Appl. No.: 19/030,213

(22) Filed: Jan. 17, 2025

(65) Prior Publication Data

US 2025/0240152 A1 Jul. 24, 2025

Related U.S. Application Data

(62) Division of application No. 17/494,609, filed on Oct. 5, 2021, now Pat. No. 12,238,203.

(51) Int. Cl.

*H04L 29/06* (2006.01)
*H04L 9/08* (2006.01)
*H04L 9/32* (2006.01)

(52) U.S. Cl.

CPC ............ *H04L 9/0825* (2013.01); *H04L 9/085* (2013.01); *H04L 9/3247* (2013.01); *H04L 9/3263* (2013.01)

(58) Field of Classification Search

CPC ..... H04L 9/0825; H04L 9/085; H04L 9/3247; H04L 9/3263; H04L 9/0894; H04L 9/3268; H04L 9/3265

See application file for complete search history.

(56) References Cited

U.S. PATENT DOCUMENTS

| | | | | |
|---|---|---|---|---|
| 8,527,764 | B2 * | 9/2013 | Kiran | H04L 9/0844 713/169 |
| 2006/0200857 | A1 | 9/2006 | Yokota | |
| 2008/0320308 | A1 | 12/2008 | Kostiainen et al. | |
| 2011/0239004 | A1 | 9/2011 | Hayashi et al. | |
| 2016/0099969 | A1 | 4/2016 | Angus et al. | |
| 2017/0228412 | A1 | 8/2017 | Agarwal et al. | |
| 2017/0324749 | A1 * | 11/2017 | Bhargava | H04L 63/123 |
| 2018/0255031 | A1 * | 9/2018 | Gvili | H04L 63/061 |
| 2018/0276626 | A1 * | 9/2018 | Laiben | G06Q 20/3829 |

(Continued)

OTHER PUBLICATIONS

Russell, Selwyn, et al. "Virtual certificates and synthetic certificates: new paradigms for improving public key validation." Computer Communications 26.16 (2003): 1826-1838. (Year: 2003).*

*Primary Examiner* — Ka Shan Choy
(74) *Attorney, Agent, or Firm* — Holland & Hart LLP

(57) ABSTRACT

Methods, systems, and devices for sharing keys with authorized users are described. In some cases, the first device may transmit, to the server, a request for a certificate for the first device to communicate with a memory device. The server may generate the certificate using a first private key of a first public-private key pair. The first device may receive the certificate and generate a content message that is signed by a second private key of a second public-private key pair. In some cases, the memory device may receive the content message and the certificate and validate the certificate using a first public key of the first public-private key pair. In such cases, the first device may establish a connection with the memory device in response to the memory device validating the certificate.

20 Claims, 9 Drawing Sheets

(56) References Cited

U.S. PATENT DOCUMENTS

| | | | |
|---|---|---|---|
| 2019/0245860 | A1 | 8/2019 | Forrest |
| 2020/0366660 | A1 | 11/2020 | Vasireddy et al. |
| 2022/0121756 | A1 | 4/2022 | Szubbocsev |
| 2023/0004660 | A1 | 1/2023 | Kim et al. |

* cited by examiner

SHARING KEYS WITH AUTHORIZED USERS

CROSS REFERENCE

The present Application for Patent is a divisional of U.S. patent application Ser. No. 17/494,609 by Liu, entitled "SHARING KEYS WITH AUTHORIZED USERS," filed Oct. 5, 2021, assigned to the assignee hereof, and is expressly incorporated by reference in its entirety herein.

FIELD OF TECHNOLOGY

The following relates generally to one or more systems for memory and more specifically to sharing keys with authorized users.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
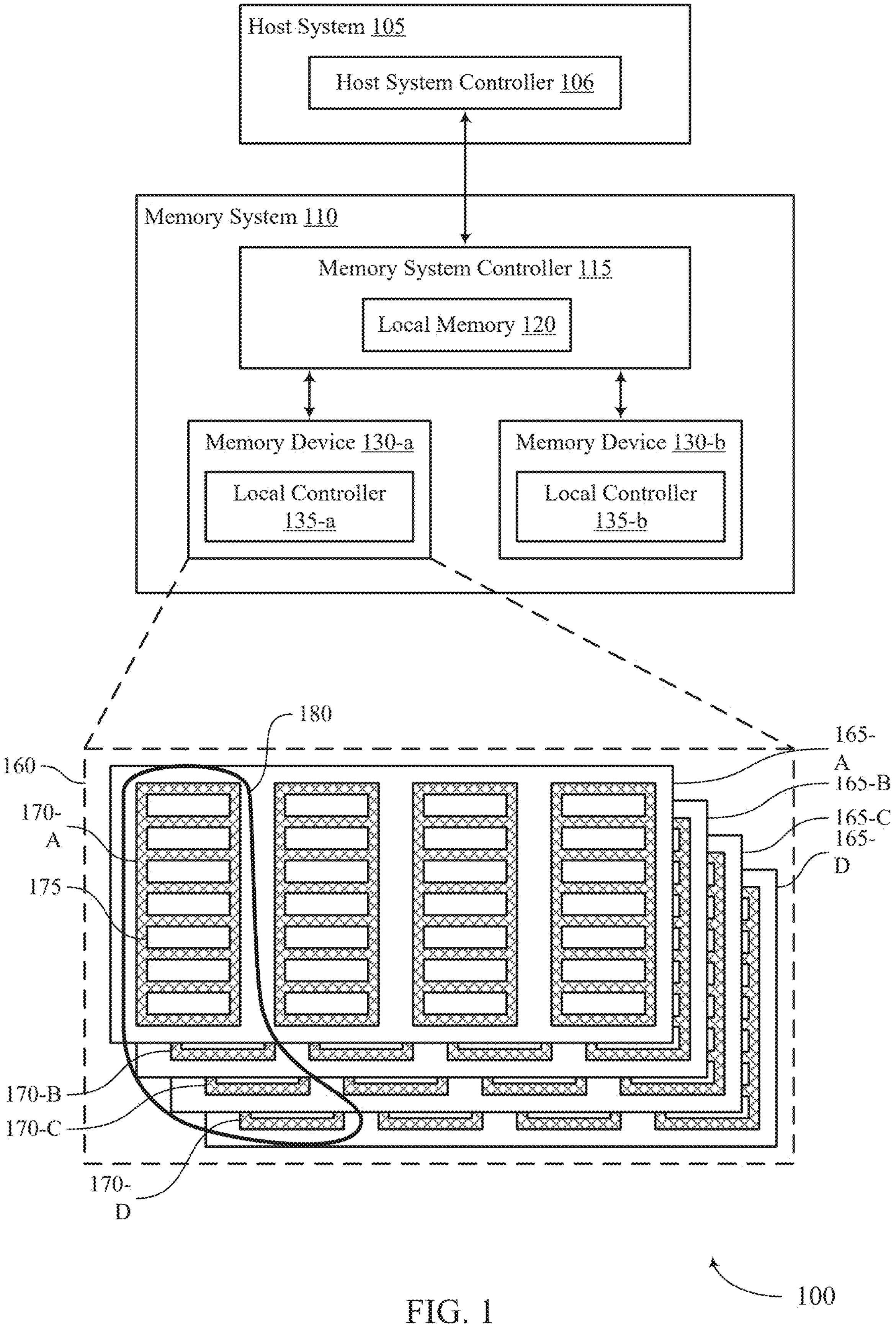
FIG. 1 illustrates an example of a system that supports sharing keys with authorized users in accordance with examples as disclosed herein.

Some systems may have security measures to ensure that unwanted actors do not make changes or gain access to information. For example, computing systems in a variety of contexts (e.g., personal computing devices, vehicles, or other contexts) may implement security measures. In some systems, one or more devices may desire to communicate with and make changes to the memory device, which changes and communications may be legitimate uses of the memory device. To ensure secure communications, some devices may use public-private key pairs to encrypt communications. In some cases, new devices may want to communicate with a memory device. In such cases, the memory device may implement procedures to establish a trusted connection with the new devices (e.g., establish a verified public-private key pair). In some cases, the memory device may be unable to dynamically change or update after the public keys are inserted into the memory device. In such cases, the communication protocol may be static, thereby decreasing the efficiency of the system because the memory system may not be able to communicate with new devices. That is, in other systems, the memory device may be able to establish a static connection with multiple devices, throttling the flow of traffic, increasing latency and resource overhead, and compromising the security of the system.

To efficiently and securely handle multiple updates to the system and trusted connections between the memory device and other devices, the system may implement a procedure to validate an intermediary device without storing the public key of the device into the memory device or storing multiple public keys of multiple devices into the memory device. In such cases, the server may validate the intermediary device. That is, keys associated with each device may be shared between multiple devices (e.g., servers, memory devices, user devices, etc.) in a secure manner without inserting the keys into portions of the memory device reserved for trusted data.

For example, the intermediary device may generate a device public-private key pair for communications with the memory device and provide a public key of the public-private key pair to a server via a request for a certificate. The certificate may be configured to establish trust between the device and the memory device. The server may generate the certificate, encode the public key into the certificate, and sign the certificate using a private key of a public-private key pair that is shared between the memory device and the server. The server may provide the certificate to the intermediary device. The intermediary device may generate a content message and sign the content message using a private key of the device public-private key pair. The intermediary device may send the content message and certificate to the memory device.

The memory device may use the certificate to establish a trusted connection with other devices. The memory device check the certificate chain (e.g., identify which device generated and/or sent the certificate) and access the contents of the certificate using the public key of the public-private key pair that is shared between the memory device and the server that may be encoded within the memory device during manufacturing. For, example, the memory device may verify that the certificate is from the server using the server public key to access the contents of the certificate signed by the server private key. In such cases, a trusted connection may be established between the memory device and the intermediary device. The memory device may use the device public key encoded within the contents of the certificate to access the content message signed by the device private key. In some examples, the memory device may perform an operation associated with the content message based on a valid signature chain and accessing the certificate during a valid period of the certificate. In such cases, access to the memory device may be established with the intermediary device for a period of time based on the validation period of the certificate.

Sharing keys with authorized users may reduce the load on the memory device by reducing the quantity of operations for validating data requests and/or by reducing a quantity of public keys encoded in the memory device. In some cases, sharing keys with authorized users may also improve security, as the memory device may establish a trusted connection if the intermediary device is successfully verified by the server. In this way, system may improve the security of the system, as the memory device may not grant access to messages received from unauthorized intermediary devices. Additionally, the system may reduce the overhead at the memory device by validating intermediary devices at the server, distributing the processing overhead across multiple servers. This may allow the system to support more users and/or memory devices without exceeding certain resource or latency thresholds. Additionally, by using a device public-private key pair, a server public-private key pair, a certificate, a content message, or a combination thereof for the validation procedure, performing the validation may efficiently utilize the available resources at the server, the intermediary device, and the memory device.

Features of the disclosure are initially described in the context of a system with reference to FIG. 1. Features of the disclosure are described in the context of a system and process flow with reference to FIGS. 2-3. These and other features of the disclosure are further illustrated by and described in the context of apparatus diagrams and flowcharts that relate to sharing keys with authorized users with reference to FIGS. 4-9.

FIG. 1 illustrates an example of a system 100 that supports sharing keys with authorized users in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support sharing keys with authorized users. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, the system 100 may include at least the memory device 130, a first device, and a server. In some cases, the first device may transmit, to the server, a request for a certificate for the first device to communicate with the memory device 130. The server may generate the certificate using a first private key of a first public-private key pair associated with the memory device 130 and the server. The first device may receive the certificate and generate a content message that is signed by a second private key of a second public-private key pair associated with the memory device 130 and the first device.

In some cases, the memory device 130 may receive the content message and the certificate. The memory device 130 may access content of the certificate using a first public key of the first public-private key pair and validate the certificate using the first public key. The first device may establish a connection with the memory device 130 in response to the memory device 130 validating the certificate. In some examples, the memory device 130 may determine that the certificate includes a second public key of the second public-private key pair generated by the first device based on validating the certificate. In such cases, the memory device 130 may access content of the content message using the second public key of the second public-private key pair.

Figure 2:
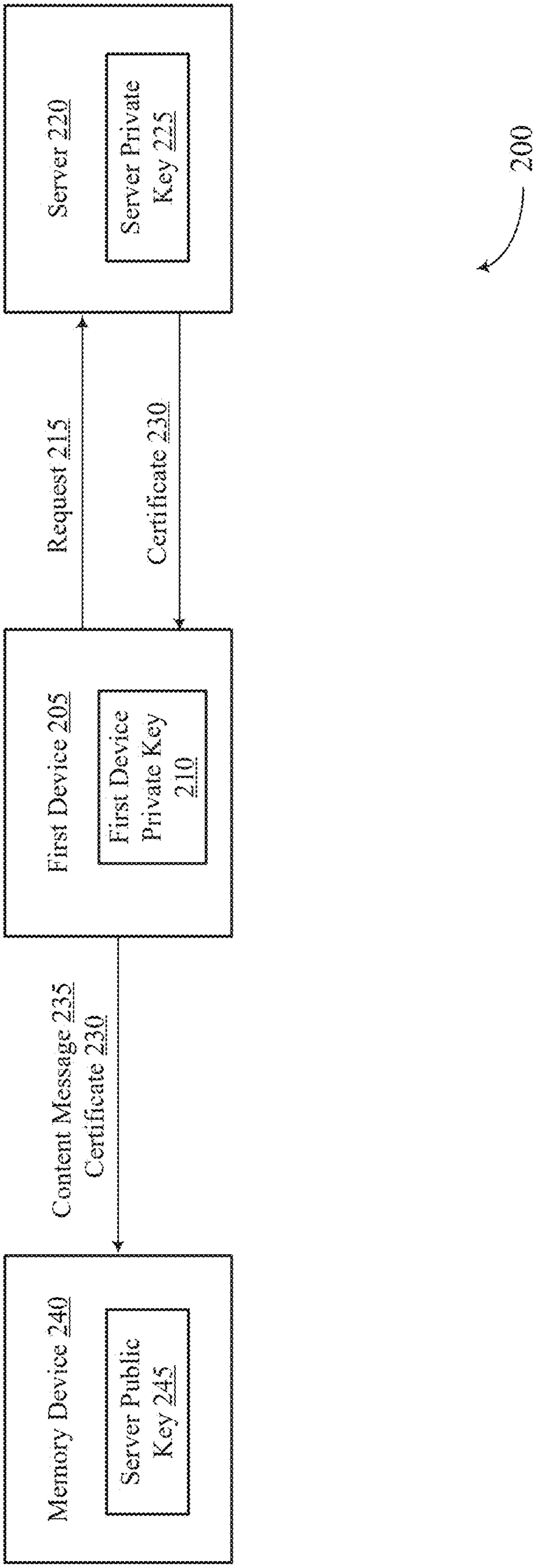
FIG. 2 illustrates an example of a system that supports sharing keys with authorized users in accordance with examples as disclosed herein.

FIG. 2 illustrates an example of a system 200 that supports sharing keys with authorized users in accordance with examples as disclosed herein. The system 200 may include a first device 205, a server 220, and a memory device 240 (or a memory system), which may be examples of the corresponding devices described with respect to FIG. 1.

In other systems, more than one device (e.g., first device 205) may desire to provide updates and/or commands to the memory device 240. In some cases, the updates may be saved in the firmware of the memory device 240. To prevent unwanted access, the memory device 240 may implement security measures, such as private-public key pairs. A quantity of public key of a public-private key pairs may be saved to the memory of the memory device 240 in a secure manner (e.g., at manufacturing). In such cases, the devices that may be authorized to communicate with the memory device 240 may be static based on what key pairs are saved by the memory device. In such cases, the latency and resource overhead associated with the memory device 240 may increase because the devices that are authorized to provide updates to the memory device 240 may be unable to dynamically change or switch out for other devices after the key pairs are inserted into the memory device 240. For example, the owner (e.g., device) of the corresponding private key of the public key saved to the memory device 240 may be the only device able to make changes to the memory device 240, thereby limiting the amount of devices able to update the memory device 240. That is, in other systems, such process may experience decreased processing times, increased latency and resource overhead, and decreased efficiency. In such cases, if a server 220 desires to use a different device's firmware and/or software to update the memory device 240, alternative techniques may be desired.

To efficiently and securely handle updates to the system 200, the system 200 may implement a procedure to validate an intermediary device (e.g., first device 205) without programming the public key of the first device 205 into the memory device 240. In some cases, the memory device 240 may store key pairs in a secure storage that may be inaccessible to some components of the memory device. As such, it may be not be allowed to store additional key pairs to that secure storage. Allowing intermediary devices to be validated may reduce the load on the memory device 240 by reducing the quantity of operations for validating data requests while also improving security, as the memory device 240 may only establish a trusted connection if the first device 205 is successfully authenticated and verified by the server 220. Accordingly, because the server 220 validates the first device 205, the memory device 240 may not have access to any resources of the first device 205 before the first device 205 is authenticated or a session for the memory device 240 is authenticated.

The system 200 may improve the security of the system 200, as the memory device 240 may not grant access to an initial connection with the unauthorized device. Additionally, the system 200 may reduce the overhead at the memory device 240 by validating one or more first devices 205 at server 220, distributing the processing overhead across multiple servers 220. This may allow the system 200 to host more tenants and support more users and/or memory devices 240 without exceeding certain resource or latency thresholds. Accordingly, the system 200 may scale usage of clients (e.g., tenants, users, user devices, memory devices 240, etc.) in a multi-tenant system. By using public-private key pairs, a certificate, a content message, or a combination thereof for the validation procedure, performing the validation may efficiently utilize the available memory at the servers 220.

The system 200 may include a first device 205. In some case, the first device 205 may include an entity that may be running a sub-system of the system 200 or include a service implemented by the system 200. The first device 205 may be third party relative to the manufacturer of the memory device 240, the user of the memory device 240, and the server 220. In some cases, the first device 205 may include a first device public-private key pair. A public-private key pair may be an example of a public key and a private key that may validate the first device 205, server 220, and/or memory device 240 for access to resources associated with each other. In some cases, the private key may be used to encrypt messages, and the public key may be used to decrypt messages. The generator of the public-private key pair may identify (e.g., obtain) the private key, however more than one device may identify (e.g., obtain) the public key. In some examples, the first device 205 may generate the first device public-private key pair. In such cases, the first device 205 may include the first device private key 210 and a first device public key. The first device private key 210 may be stored in a local storage system of the first device 205 while the first device public key may be transmitted between the server 220 and the memory device 240. The first device public-private key pair may be associated with the memory device 240 and the first device 205.

In some cases, the first device 205 may generate a request 215. In such cases, the first device 205 may transmit, to the server 220, the request 215. The request 215 may request a certificate 230 for the first device 205 to communicate with the memory device 240. For example, the request 215 may be an example of a certificate service request. In some cases, the request 215 may include the first device public key.

The server 220 may receive, from the first device 205, the request 215 for a certificate for the first device 205 to communicate with the memory device 240. In some cases, the server 220 may be implemented or controlled by the same entity that manufactured the memory device 240. In some cases, the server 220 may be operated by a third party. The server 220 may be an example of a key management server (KMS). The server 220 may include a server private key 225 of a server public-private key pair. The server public-private key pair may be associated with the memory device 240 and the server 220. The server private key 225 may be stored in a local storage system of the server 220 while the server public key 245 may be stored in a local storage system of the memory device 240.

The public-private key pair storage configuration may result in a secure system 200, as the private key is stored by a single device (i.e., the corresponding first device 205 or server 220). For example, the first device 205 may store the first device private key 210 and the server 220 may store the server private key 225. Issuing the server private key 225 may be sufficient for the server 220 to validate that the first device 205 is operated by a valid user of a trusted tenant. By never storing the server private key 225 in persistent memory of the first device 205 or memory device 240 and/or by never storing the first device private key 210 in persistent memory of the server 220 and memory device 240, confidential information associated with the private keys may be removed from the memory of the devices upon reboot, upon flushing the volatile memory (e.g., random access memory (RAM)), or upon garbage collection of a virtual machine (e.g., a Java virtual machine (JVM)), thereby increasing the security of the system 200.

The server 220 may generate the certificate 230 using the server private key 225 of the server public-private key pair. The certificate 230 may be include an identification ID of the first device 205, a reservation period (e.g., a duration of time that the certificate 230 is valid), information associated with the first device public key, a serial number associated with the certificate 230 which may indicate which device generated the certificate 230, or a combination thereof.

The server 220 may sign the certificate 230 using the server private key 225. Signing the certificate 230 may be an example of verifying that the server 220 generates the certificate 230 and trusts the first device 205 to provide the certificate 230 to the memory device 240. In some cases, signing the certificate 230 may be an example of including information in the certificate 230 encrypted by the server private key 225. The signature may be associated with the content of the certificate 230. In some cases, the signature may include data associated with the certificate 230. For example, the signature may include a name (e.g., identification ID) of the certificate 230, a time that the certificate 230 was generated by the server 220, a time that the certificate 230 was signed using the server private key 225, or a combination hereof.

In some cases, the signature of the certificate 230 (e.g., signed by the server private key 225) may verify that the content of the certificate 230 is unchanged by any other device outside of the server 220 and that the content of the certificate 230 has been assigned (e.g., signed) by the server private key 225. In such cases, the memory device 240 may identify that the first device 205 is verified (e.g., authenticated) by the server 220 such that the information included with or encapsulated within the certificate 230 is verified. In such cases, the server 220 may establish a trusted connection with first device 205. The trusted connection may be an example of an authenticated connection between the first device 205 and the server 220. The server 220 may transmit, to the first device 205, the certificate 230 generated using the server private key 225.

The first device 205 may receive, from the server 220, the certificate 230 generated using the server private key 225 of the server public-private key pair. Based on receiving the certificate 230, the first device 205 may generate a content message 235 that includes a signature of the first device private key 210 of the first device public-private key pair. In such cases, the first device 205 may generate the content message 235 using the first device private key 210. For example, the signature may include a name (e.g., identification) of the content message 235, a time that the content message 235 was generated by the first device 205, a time that the content message 235 was signed using the first device private key 210, or a combination thereof. In some cases, the signature of the content message 235 (e.g., signed by the first device private key 210) may verify that the content message 235 is unchanged by any other device outside of the first device 205 and that the content message 235 has been assigned (e.g., signed) by the first device private key 210. The content message 235 may be an example of an update or command for the memory device 240. The content message 235 may be an example of a firmware update, a software update, a boot image, a secure command, or a combination thereof.

The first device 205 may transmit, to the memory device 240, the content message 235 and the certificate 230 based on generating the content message 235. The memory device 240 may receive the content message 235 and the certificate 230 based on the first device 205 generating the content message 235. The memory device 240 may include the server public key 245 of the server public-private key pair. The server public key 245 may be integrated into the memory device 240 during manufacturing. In such cases, the server public key 245 may be write protected such that the server public key 245 may be unable to be edited in the memory device 240. For example, the server public key 245 of the server public-private key pair may be stored in the memory device 240 during manufacturing and is inaccessible to one or more components of the memory device 240. The server public key 245 may be assigned and securely saved in the memory device 240 in a write protected area (e.g., not mutable) to the memory device 240 during manufacturing.

The memory device 240 may use the server public key 245 to open (e.g., verify) the certificate 230. For example, the memory device 240 may access content of the certificate 230 using the server public key 245 of the server public-private key pair based on receiving the content message 235 and the certificate 230. In such cases, the memory device 240 may validate the certificate 230 using the server public key 245 of the server public-private key pair based on accessing the content of the certificate 230. The first device 205 may establish a trusted connection with the memory device 240 in response to the memory device 240 validating the certificate 230.

The memory device 240 may use the first device public key (e.g., included in the certificate 230) to open and verify the content message 235. For example, the memory device 240 may determine that the certificate 230 includes the first device public key of the first public-private key pair based on validating the certificate 230. In such cases, the memory device 240 may access the content message 235 signed by the first device private key 210 by using the corresponding first device public key accessed within the certificate 230. In some examples, the memory device 240 may perform the operations associated with the content message 235. For example, the memory device 240 may access content of the content message 235 using the first device public key of the first device public-private key pair based on determining that the certificate 230 includes the first device public key.

In some cases, the memory device 240 may include a memory location that may be written to by an access command (e.g., write command, access command, read command, erase command, etc.). The memory device 240 may be incorporated into a larger system (e.g., a vehicle). The memory device 240 may be configured to interact with multiple sub-systems of the larger system and to interact with multiple services.

Figure 3:
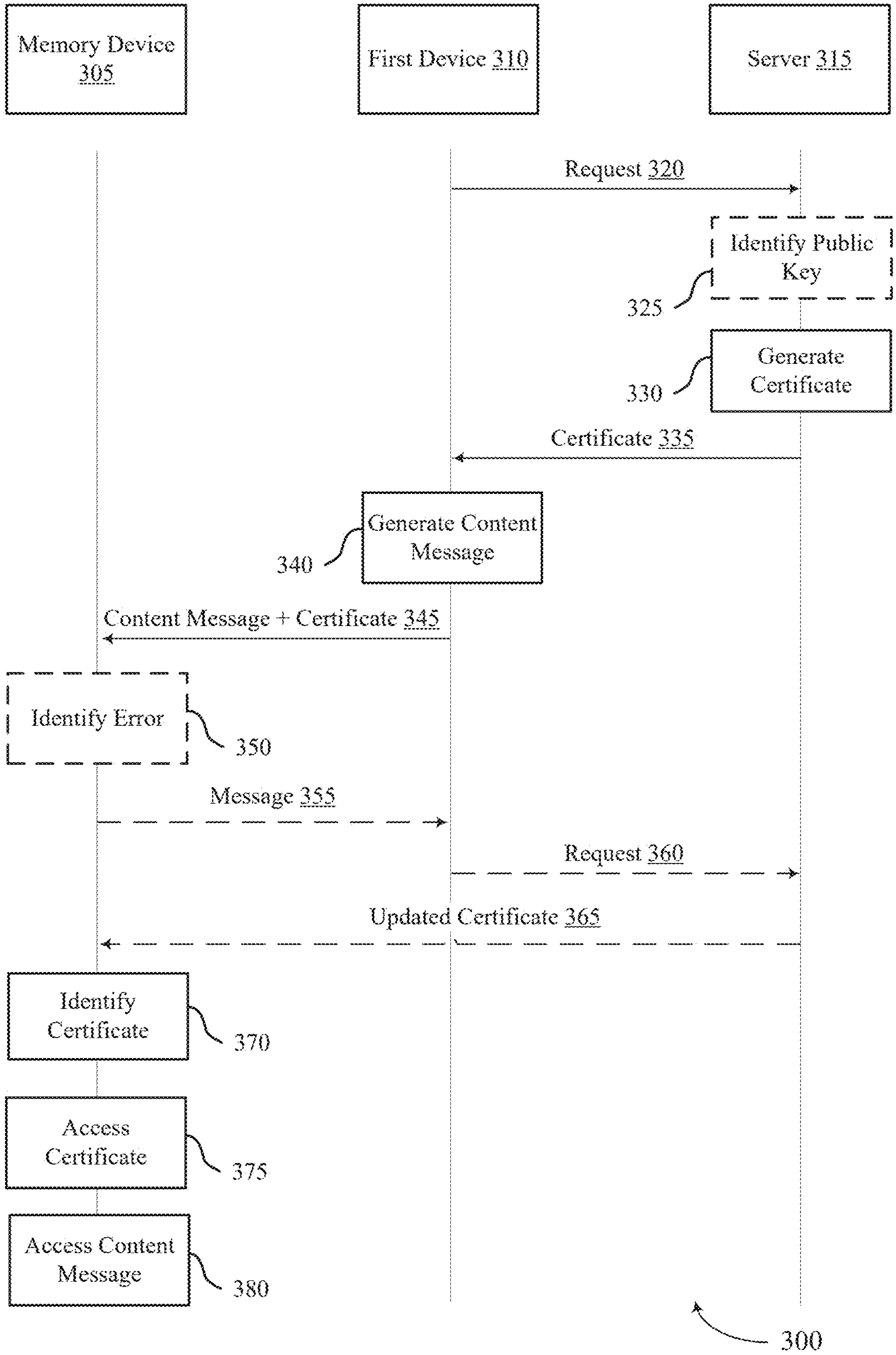
FIG. 3 illustrates an example of a process flow that supports sharing keys with authorized users in accordance with examples as disclosed herein.

FIG. 3 illustrates an example of a process flow 300 that supports sharing keys with authorized users in accordance with examples as disclosed herein. The process flow 300 may include a memory device 305, a first device 310, and a server 315. The memory device 305, the first device 310, and the server 315 may be examples of the corresponding devices described with respect to FIGS. 1 and 2. Alternative examples of the following may be implemented, where some steps are performed in a different order than described or not performed at all. In some cases, steps may include additional features not mentioned below, or further steps may be added.

At 320, the first device 310 may send a request to the server 315. The request may be an example of a certificate server request (CSR) that includes a request for the certificate from the server 315. In some cases, the request may include an identification ID (e.g., a name associated with the first device 310) and a first device public key of the first device public-private key pair. In such cases, the first device 310 may generate the first device public-private key pair prior to transmitting the request to the server 315. For example, the first device 310 may generate the request for the certificate in response to (e.g., based on) generating the first device public-private key pair. In such cases, the first device 310 may transmit the request in direct response to (e.g., based on) generating the first device public-private key pair. In some cases, the first device 310 may transmit the first device public key within the request. For example, the request may include the first device public key.

At 325, the server 315 may identify the first device public key within the request. For example, the server 315 may receive, as part of the request for the certificate, the first device public key of the first device public-private key pair generated by the first device 310. The server 315 may determine that the request includes the first device public key. The server 315 may validate the first device public key based on receiving the first device public key. For example, the server 315 may check and verify that the first device public key matches the server private key of a server public-private key pair. The server 315 may trust (e.g., validate) the first device 310 based on receiving the request for the certificate that includes the first device public key. In response to validating the first device public key (e.g., verifying that the keys match), the server 315 may generate the certificate. In such cases, the first device 310 may be associated with the server 315 based on the server 315 validating the first device public key. For example, the server 315 may authenticate the first device 310 directly in response to (e.g., based on) validating the first device public key.

At 330, the server 315 may generate a certificate. The certificate may include the first device public key. In some cases, the server 315 may generate the certificate in response to (e.g., based on) determining that the request for the certificate includes the first device public key. The server 315 may authenticate the first device 310 prior to generating the certificate. For example, the certificate may be generated based on validating the first device public key of the first device public-private key pair.

The certificate may be signed with the server private key, thereby endorsing the first device public key. In such cases, the server 315 may encode the first device public key in the certificate in response to receiving the first device public key. For example, the server 315 may package the first device public key within the certificate and sign the certificate (e.g., including the first device public key) using the server private key. In such cases, the first device public key and the certificate may be signed by the server private key.

In some cases, the server 315 may identify a validation period. The validation period may indicate a duration of time that the certificate is validated by the server 315. For example, the server 315 may determine a duration of time that the certificate is valid based on receiving the request for the certificate. The server 315 may generate the certificate after determining the duration of time that the certificate is valid. The validation period may indicate that certificate is valid after a time period and/or before time period. For example, the certificate may include a start time and/or an end time of the validation period. In some cases, the server 315 may indicate that the first device 310 is authenticated during the validation period. If the memory device 305 receives the certificate outside of the validation period, the memory device 305 may be identify the message as being from an unauthorized user and may refrain from accessing the contents of the message, as described below in further detail.

In some examples, the server 315 may determine a duration of time for access to the memory device 305 based on receiving the request for the certificate. In such cases, the server 315 may generate the certificate after determining the duration of time for access to the memory device 305. For example, the server 315 may determine that the first device public key is active for a duration of time in which the memory device 305 may be accessed. The certificate may indicate the duration of time for access to the memory device.

In some cases, the server 315 may not authenticate the first device 310. For example, the server 315 may refrain from validating the first device 310 based on receiving the request and determining that the request does not include the first device public key or does not satisfy other criteria for communicating with the memory device. In such cases, the server 315 may be unable to validate the first device 310 and generate the certificate. For example, the server 315 may refrain from generating the certificate until the server 315 receives a request that satisfies the criteria. The server 315 may send a message to the memory device 305 notifying the memory device 305 that the first device 310 is not authenticated and requesting the first device public key from the first device 310.

At 335, the server 315 may send the certificate to the first device 310. For example, the server 315 may transmit the certificate in response to encoding the first device public key in the certificate. In such cases, the first device 310 may receive the certificate. The first device 310 may be unable to read the contents of the certificate because the first device 310 does not have access to the server public key of the server public-private key pair that is used to access the certificate signed by the corresponding server private key.

At 340, the first device 310 may generate a content message. For example, the first device may generate the content message directly in response to receiving the certificate. In some examples, the first device 310 may determine that the certificate is signed by the server private key of the server public-private key pair and generate the content message based on determining that the certificate is signed. The content message may include a firmware update, a software update, a boot image, a secure command, or a combination thereof.

The content message may be generated using the first device private key. For example, the content message may be signed with the first device private key. In some examples, the first device 310 may package the content message with certificate where the content message may be signed with first device private key. In such cases, the certificate may be signed by the server private key, and the content message may be signed by the first device private key.

At 345, the first device 310 may send the content message and the certificate to the memory device 305. In such cases, the first device 310 may send, to the memory device 305, the first device public key within the certificate that is signed by the server private key. The first device 310 may send, to the memory device 305, the content message signed by the first device private key.

At 350, the memory device 305 may identify an error. For example, the memory device 305 may identify an error associated with the certificate based on receiving the content message and the certificate. In such cases, the memory device 305 may determine that certificate is invalid, corrupt, absent, or a combination thereof. The memory device 305 may be unable to validate the certificate based on identifying the error. In some examples, the memory device 305 may determine that the certificate is invalid or corrupt based on the memory device 305 determining that the certificate is received outside (e.g., before or after) the duration of time that the certificate is valid. In such cases, the memory device 305 may be unable to access the content message (e.g., refrain from updating the memory device 305) if the certificate is received outside the validation period.

In some examples, the memory device 305 may determine that the certificate is invalid or corrupt based on the memory device 305 determining that the certificate is transmitted from an entity (e.g., device) other than the server 315. In such cases, the memory device 305 may determine that the certificate is generated using a different private key of a different public-private key pair. The error may be identified based on determining that the certificate is not transmitted from the server 315. The memory device 305 may be unable to access the content message (e.g., refrain from updating the memory device 305) if the certificate is from a device other than the server 315.

In some cases, the memory device 305 may determine that the certificate is received outside a duration of time for access to the memory device 305 based on receiving the content message and the certificate. In such cases, the memory device 305 may identify the error based on determining that the certificate is received before or after the duration of time for access to the memory device 305. The memory device 305 may be unable to access the content message (e.g., refrain from updating the memory device 305) if the certificate is received outside the duration of time to access the memory device 305.

In some cases, the memory device 305 may check a revoke list based on receiving the content message and the certificate. The revoke list may include a list of untrusted (e.g., unauthenticated) first devices 310 and/or servers 315 that may not be trusted to communicate with the memory device 305. In other examples, the revoke list may include a duration of time that the trusted (e.g., authenticated) first devices 310 and/or server 315 may communicate with the memory device 305. For example, the memory device 305 may receive the content message and the certificate and check the revoke list. The memory device 305 may identify that the first device 310 may be included in the revoke list such that the first device 310 is not a trusted partner. In other examples, the memory device 305 may identify that the first device 310 may be included in the revoke list such that the first device 310 was previously a trusted partner but is not a trusted partner because the duration of time that the first device 310 is authenticated has expired.

At 355, the memory device 305 may generate a message indicating the error associated with the certificate. The message may indicate that the certificate is invalid, absent, corrupt, or a combination thereof. In some cases, the message may indicate that the first device 310 is invalid or corrupt. The memory device 305 may send the message indicating the error to the first device 310 in response to generating the message. In some examples, the memory device 305 may send the message indicating the error to the server 315. In some cases, the memory device 305 may be unable to access the contents of the certificate based on a failed authentication between the server 315 and the first device 310. In such cases, the memory device 305 may send a message to the first device 310 and/or the server 315 of the failed authentication and requesting a verified certificate (e.g., including the first device public key to access the content message).

The first device 310 may receive the message indicating the error associated with the certificate. In some cases, the first device 310 may update the certificate in response to receiving the message. For example, the first device 310 may generate an updated certificate. The first device 310 may send the updated certificate to the memory device 305 based on receiving the message and updating the certificate. In other examples, the first device 310 may be unable to update the certificate and may send the message to the server 315.

At 360, the first device 310 may send a request to the server 315. For example, the first device 310 may transmit a CSR to the server 315 based on receiving the message indicating the error. The request may include a request for an updated certificate based on the error. The server 315 may generate an updated certificate directly in response to receiving the request. For example, the server 315 may update the duration of time that the certificate is valid, update the duration to access the memory device 305, generate a new certificate, or a combination thereof.

At 365, the server 315 may send the updated certificate to the memory device 305. In some examples, the server 315 may send the updated certificate to the first device 310. The first device 310 may receive, from the server 315, the updated certificate generated using the server private key. In such cases, the first device 310 may verify (e.g., check) the content message, generate an updated content message, or both. In some examples, the first device 310 may send the updated certificate and/or updated content message to the memory device 305. For example, the first device 310 may transmit, to the memory device 305, the updated certificate and/or updated content message based on receiving the updated certificate. The memory device 305 may receive the updated certificate directly from the server 315 or from the server 315 via the first device 310. For example, the memory device 305 may receive the updated certificate generated by the server 315 based on the memory device 305 transmitting the message indicating the error to the first device 310.

At 370, the memory device 305 may identify the certificate in response to receiving the certificate and the content message. For example, the memory device 305 may receive the certificate and determine that the certificate is from (e.g., generated by) the server 315 based on the certificate being signed by the server private key. For example, the memory device 305 may determine that the certificate is transmitted from the server 315 based on receiving the certificate generated using the server private key. In such cases, the memory device 305 may determine that the certificate is from the server. In some cases, the memory device 305 may determine that the certificate is self-signed with the server private key. The certificate may be an example of a root certificate.

The memory device 305 may determine that the certificate is received during the duration of time that the certificate is valid based on receiving the content message and the certificate. In some examples, the memory device 305 may determine that the certificate is received during a duration of time for access to the memory device 305 based on receiving the content message and the certificate. The memory device 305 may validate (e.g., check) the server private key signature with the server public key assigned to the memory device 305 during manufacturing. In such cases, the memory device 305 may determine that the certificate is self-signed with the server private key corresponding to the server public key of encoded within the memory device 305.

At 375, the memory device 305 may access the certificate. For example, the memory device 305 may use the server public key to open (e.g., access) the certificate. If the certificate is self-signed by the server private key, the server public key may be used to verify the signature of the certificate. The memory device 305 may validate the certificate with the server public key encoded in the memory device 305 during manufacturing. In such cases, the memory device 305 may access the contents of the certificate and identify the first device public key within the certificate.

The memory device 305 may extract the first device public key from the validated certificate, and use first device public key to decrypt (e.g., access) the content message that is signed by the first device private key. In such cases, the memory device 305 may use the server public key to check the certificate and extract the first device public key from the certificate prior to accessing the content message.

The memory device 305 may access the content of the certificate in direct response to determining that the certificate is received during the duration of time for access to the memory device 305. In some cases, accessing the content of the certificate may be based on receiving the updated certificate. The memory device 305 may access the content of the certificate based on determining that the certificate is transmitted from the server 315. In other examples, the memory device 305 may access the contents of the certificate based on determining that that the certificate is received during the duration of time that the certificate is valid.

At 380, the memory device 305 may access the content message. The memory device 305 may use the first device pubic key to open (e.g., access) the content message that is signed by first device private key. The memory device 305 may determine that the content message is signed by a first device private key of the first device public-private key pair. In such cases, the memory device 305 may access the content message based on determining that the content message is signed by the first device private key.

In some cases, accessing the content of the certificate may be based on receiving the updated certificate. The memory device 305 may access the content message based on determining that the certificate is transmitted from the server 315. In other examples, the memory device 305 may access the content message based on determining that that the certificate is received during the duration of time that the certificate is valid.

The memory device 305 may perform an access operation on one or more memory arrays of the memory device 305 based on accessing the content of the content message. The content message may include a firmware update, a software update, a boot image, a secure command, or a combination thereof. For example, the memory device 305 may check the certificate and use the first device public key in the certificate to check the boot up image signature (e.g., content message). In some cases, the boot image may be valid for a duration of time. In other examples, the memory device 305 may check the certificate and use the first device public key in the certificate to check the command signature (e.g., content message) based on the content message including the secure command. The secure command may be valid for a duration of time.

Figure 4:
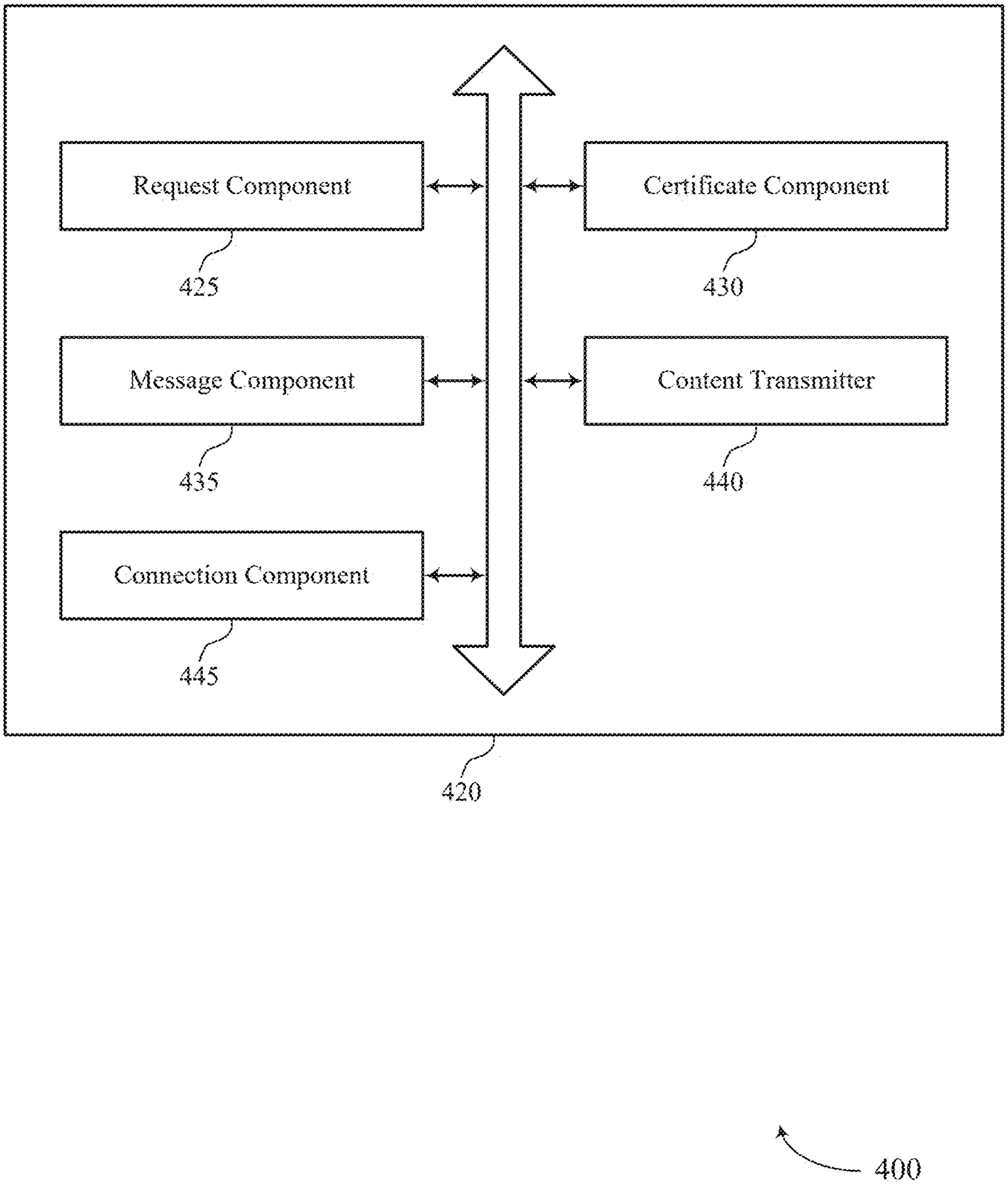
FIG. 4 shows a block diagram of a first device that supports sharing keys with authorized users in accordance with examples as disclosed herein.

FIG. 4 shows a block diagram 400 of a first device 420 that supports sharing keys with authorized users in accordance with examples as disclosed herein. The first device 420 may be an example of aspects of a first device as described with reference to FIGS. 1 through 2. The first device 420, or various components thereof, may be an example of means for performing various aspects of sharing keys with authorized users as described herein. For example, the first device 420 may include a request component 425, a certificate component 430, a message component 435, a content transmitter 440, a connection component 445, or any combination thereof. Each of these components may communicate, directly or indirectly, with one another (e.g., via one or more buses).

The request component 425 may be configured as or otherwise support a means for transmitting, by a first device and to a server, a request for a certificate for the first device to communicate with a memory device. The certificate component 430 may be configured as or otherwise support a means for receiving, from the server, the certificate generated using a first private key of a first public-private key pair associated with the memory device and the server, the certificate indicating a duration of time that the certificate is valid. The message component 435 may be configured as or otherwise support a means for generating a content message that is signed by a second private key of a second public-private key pair associated with the memory device and the first device. The content transmitter 440 may be configured as or otherwise support a means for transmitting, to the memory device, the content message and the certificate based at least in part on generating the content message. The connection component 445 may be configured as or otherwise support a means for establishing, by the first device, a connection with the memory device in response to the memory device validating the certificate.

In some examples, the request component 425 may be configured as or otherwise support a means for generating the second public-private key pair including the second private key and a second public key, where transmitting the request for the certificate includes transmitting the second public key of the second public-private key pair, where the certificate includes the second public key.

In some examples, the request component 425 may be configured as or otherwise support a means for generating the request for the certificate based at least in part on generating the second public-private key pair, where transmitting the request for the certificate is based at least in part on generating the request for the certificate, where the request for the certificate includes the second public key.

In some examples, the message component 435 may be configured as or otherwise support a means for receiving, from the memory device, a message indicating an error associated with the certificate, where the error indicates that the certificate is invalid, absent, corrupt, or a combination thereof.

In some examples, the request component 425 may be configured as or otherwise support a means for transmitting, to the server, a request for an updated certificate based at least in part on receiving the message. In some examples, the certificate component 430 may be configured as or otherwise support a means for receiving, from the server, the updated certificate generated using the first private key of the first public-private key pair. In some examples, the content transmitter 440 may be configured as or otherwise support a means for transmitting, to the memory device, the updated certificate based at least in part on receiving the updated certificate.

In some examples, the certificate component 430 may be configured as or otherwise support a means for determining that the certificate is signed by the first private key of the first public-private key pair, where generating the content message is based at least in part on determining that the certificate is signed.

In some examples, the content message includes a firmware update, a software update, a boot image, a secure command, or a combination thereof.

In some examples, the certificate indicates the duration of time for access to the memory device.

Figure 5:
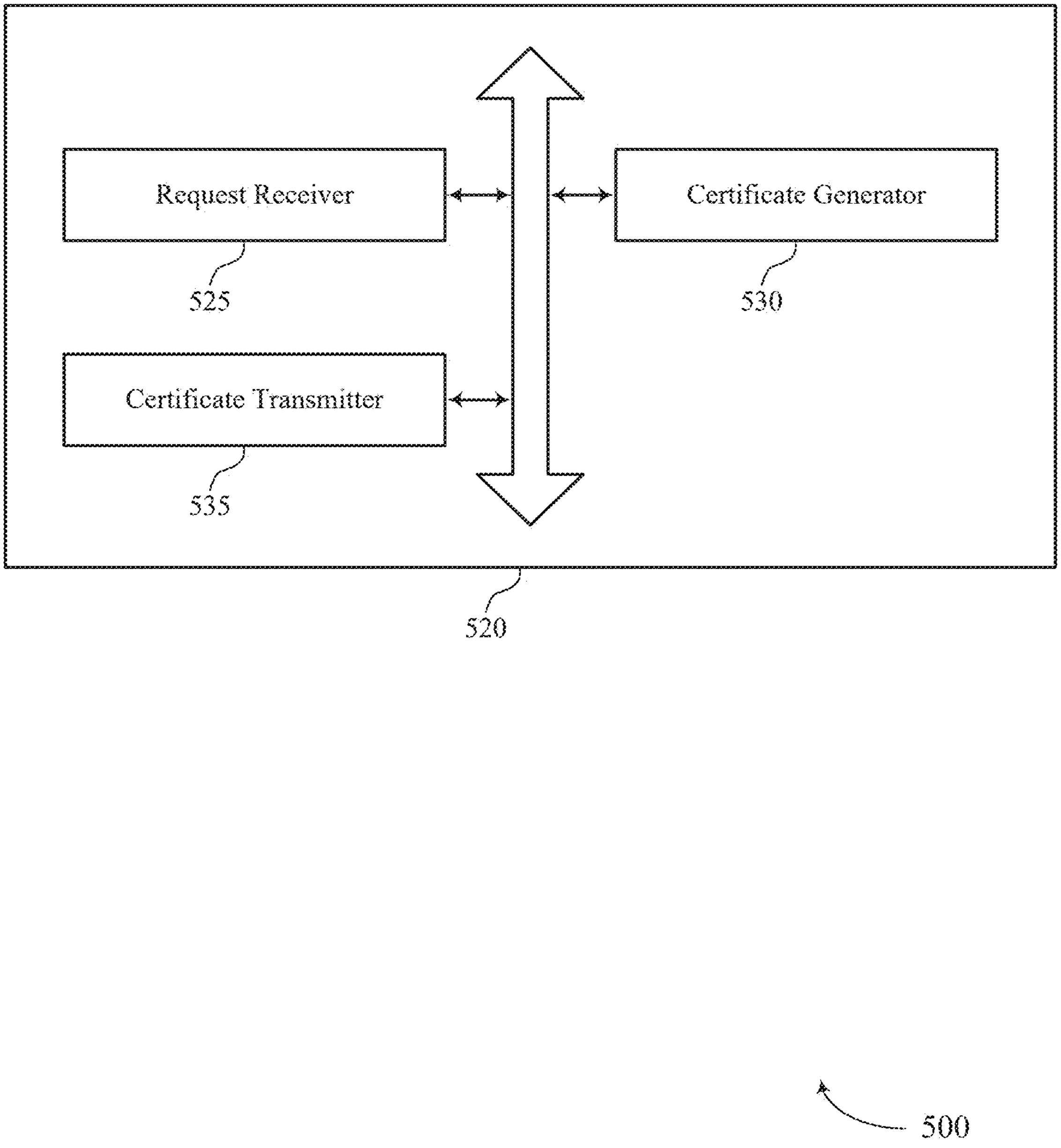
FIG. 5 shows a block diagram of a server that supports sharing keys with authorized users in accordance with examples as disclosed herein.

FIG. 5 shows a block diagram 500 of a server 520 that supports sharing keys with authorized users in accordance with examples as disclosed herein. The server 520 may be an example of aspects of a server as described with reference to FIGS. 1 through 2. The server 520, or various components thereof, may be an example of means for performing various aspects of sharing keys with authorized users as described herein. For example, the server 520 may include a request receiver 525, a certificate generator 530, a certificate transmitter 535, or any combination thereof. Each of these components may communicate, directly or indirectly, with one another (e.g., via one or more buses).

The request receiver 525 may be configured as or otherwise support a means for receiving, from a first device and by a server, a request for a certificate for the first device to communicate with a memory device. The certificate generator 530 may be configured as or otherwise support a means for generating the certificate using a first private key of a first public-private key pair associated with the memory device and the server. The certificate transmitter 535 may be configured as or otherwise support a means for transmitting, by the server and to the first device, the certificate generated using the first private key of the first public-private key pair.

In some examples, the certificate generator 530 may be configured as or otherwise support a means for determining a duration of time that the certificate is valid based at least in part on receiving the request for the certificate, where generating the certificate is based at least in part on determining the duration of time that the certificate is valid.

In some examples, the certificate generator 530 may be configured as or otherwise support a means for determining a duration of time for access to the memory device based at least in part on receiving the request for the certificate, where generating the certificate is based at least in part on determining the duration of time for access to the memory device.

In some examples, the certificate indicates the duration of time for access to the memory device.

In some examples, the request receiver 525 may be configured as or otherwise support a means for receiving, as part of the request for the certificate, a second public key of a second public-private key pair generated by the first device, where generating the certificate is based at least in part on determining that the request for the certificate includes the second public key.

In some examples, the certificate generator 530 may be configured as or otherwise support a means for validating the second public key of the second public-private key pair based at least in part on receiving the second public key, where generating the certificate is based at least in part on validating the second public key of the second public-private key pair.

In some examples, the certificate transmitter 535 may be configured as or otherwise support a means for encoding the second public key of the second public-private key pair in the certificate based at least in part on receiving the second public key, where transmitting the certificate is based at least in part on encoding the second public key in the certificate.

Figure 6:
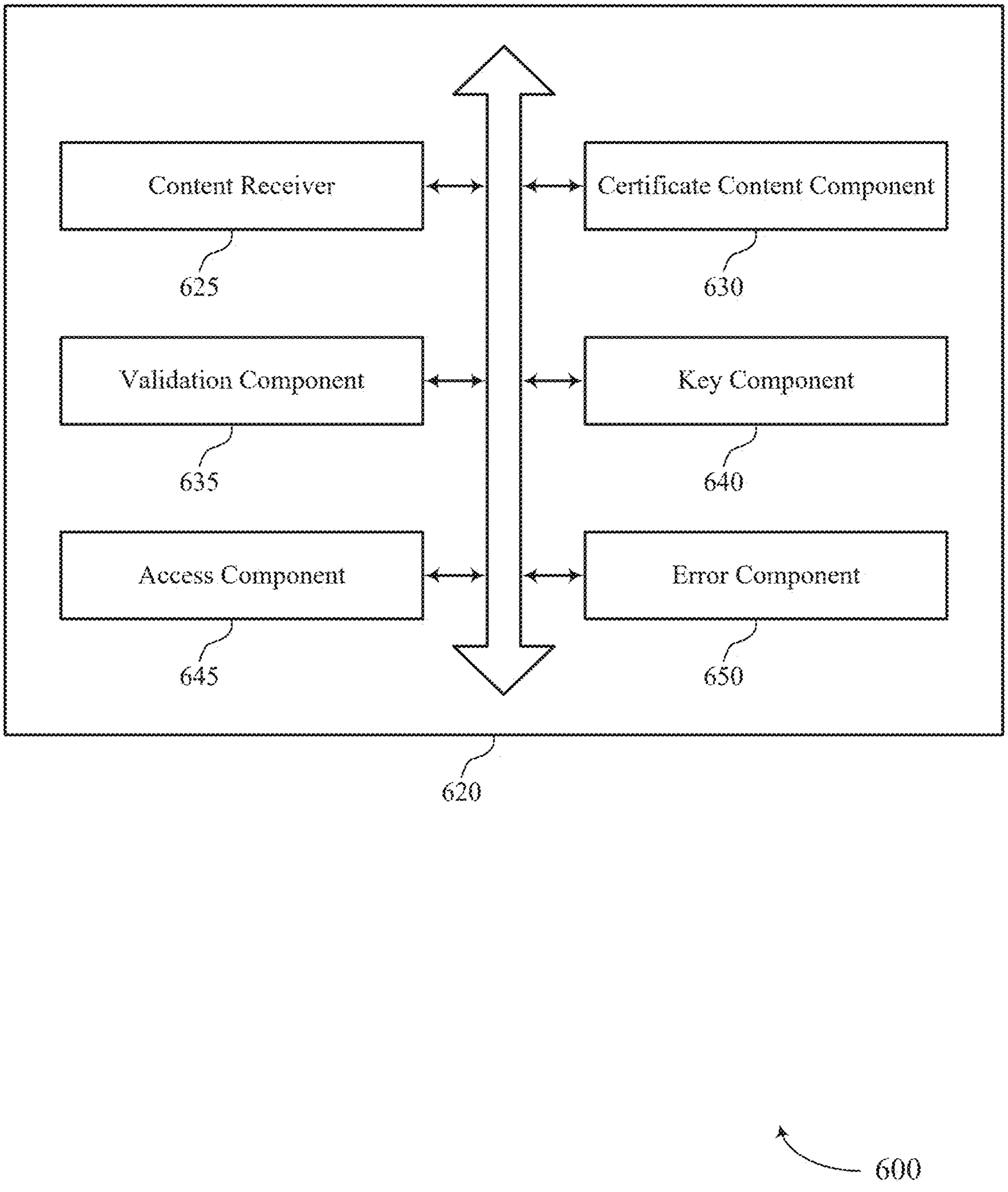
FIG. 6 shows a block diagram of a memory device that supports sharing keys with authorized users in accordance with examples as disclosed herein.

FIG. 6 shows a block diagram 600 of a memory device 620 that supports sharing keys with authorized users in accordance with examples as disclosed herein. The memory device 620 may be an example of aspects of a memory device or a memory system as described with reference to FIGS. 1 through 2. The memory device 620, or various components thereof, may be an example of means for performing various aspects of sharing keys with authorized users as described herein. For example, the memory device 620 may include a content receiver 625, a certificate content component 630, a validation component 635, a key component 640, an access component 645, an error component 650, or any combination thereof. Each of these components may communicate, directly or indirectly, with one another (e.g., via one or more buses).

The content receiver 625 may be configured as or otherwise support a means for receiving, by a memory device and from a first device, a content message and a certificate generated using a first private key of a first public-private key pair associated with the memory device and a server. The certificate content component 630 may be configured as or otherwise support a means for accessing content of the certificate using a first public key of the first public-private key pair based at least in part on receiving the content message and the certificate. The validation component 635 may be configured as or otherwise support a means for validating the certificate using the first public key of the first public-private key pair based at least in part on accessing the content of the certificate. The key component 640 may be configured as or otherwise support a means for determining that the certificate includes a second public key of a second public-private key pair generated by the first device based at least in part on validating the certificate. The access component 645 may be configured as or otherwise support a means for accessing content of the content message using the second public key of the second public-private key pair based at least in part on determining that the certificate includes the second public key.

In some examples, the certificate indicates a duration of time that the certificate is valid, and the certificate content component 630 may be configured as or otherwise support a means for determining that the certificate is received during the duration of time that the certificate is valid based at least in part on receiving the content message and the certificate, where accessing the content is based at least in part on determining that that the certificate is received during the duration of time that the certificate is valid.

In some examples, the certificate content component 630 may be configured as or otherwise support a means for determining that the certificate is transmitted from the server based at least in part on receiving the certificate generated using the first private key of the first public-private key pair, where accessing the content of the certificate is based at least in part on determining that the certificate is transmitted from the server.

In some examples, the access component 645 may be configured as or otherwise support a means for determining that the content message is signed by a second private key of the second public-private key pair, where accessing the content of the content message using the second public key is based at least in part on determining that the content message is signed by the second private key.

In some examples, the certificate content component 630 may be configured as or otherwise support a means for determining that the certificate is received during a duration of time for access to the memory device based at least in part on receiving the content message and the certificate, where accessing the content of the certificate is based at least in part on determining that the certificate is received during the duration of time for access to the memory device.

In some examples, the error component 650 may be configured as or otherwise support a means for identifying an error associated with the certificate based at least in part on receiving the content message and the certificate. In some examples, the error component 650 may be configured as or otherwise support a means for generating a message indicating the error associated with the certificate, where the error indicates that the certificate is invalid, absent, corrupt, or a combination thereof.

In some examples, the error component 650 may be configured as or otherwise support a means for transmitting, to the first device, the message indicating the error based at least in part on generating the message. In some examples, the error component 650 may be configured as or otherwise support a means for receiving an updated certificate generated by the server based at least in part transmitting the message indicating the error, where accessing the content of the certificate is based at least in part on receiving the updated certificate.

In some examples, the access component 645 may be configured as or otherwise support a means for performing an access operation on one or more memory arrays of the memory device based at least in part on accessing the content of the content message.

In some examples, the content message includes a firmware update, a software update, a boot image, a secure command, or a combination thereof.

In some examples, the first public key of the first public-private key pair is stored in the memory device during manufacturing and is inaccessible to one or more components of the memory device.

Figure 7:
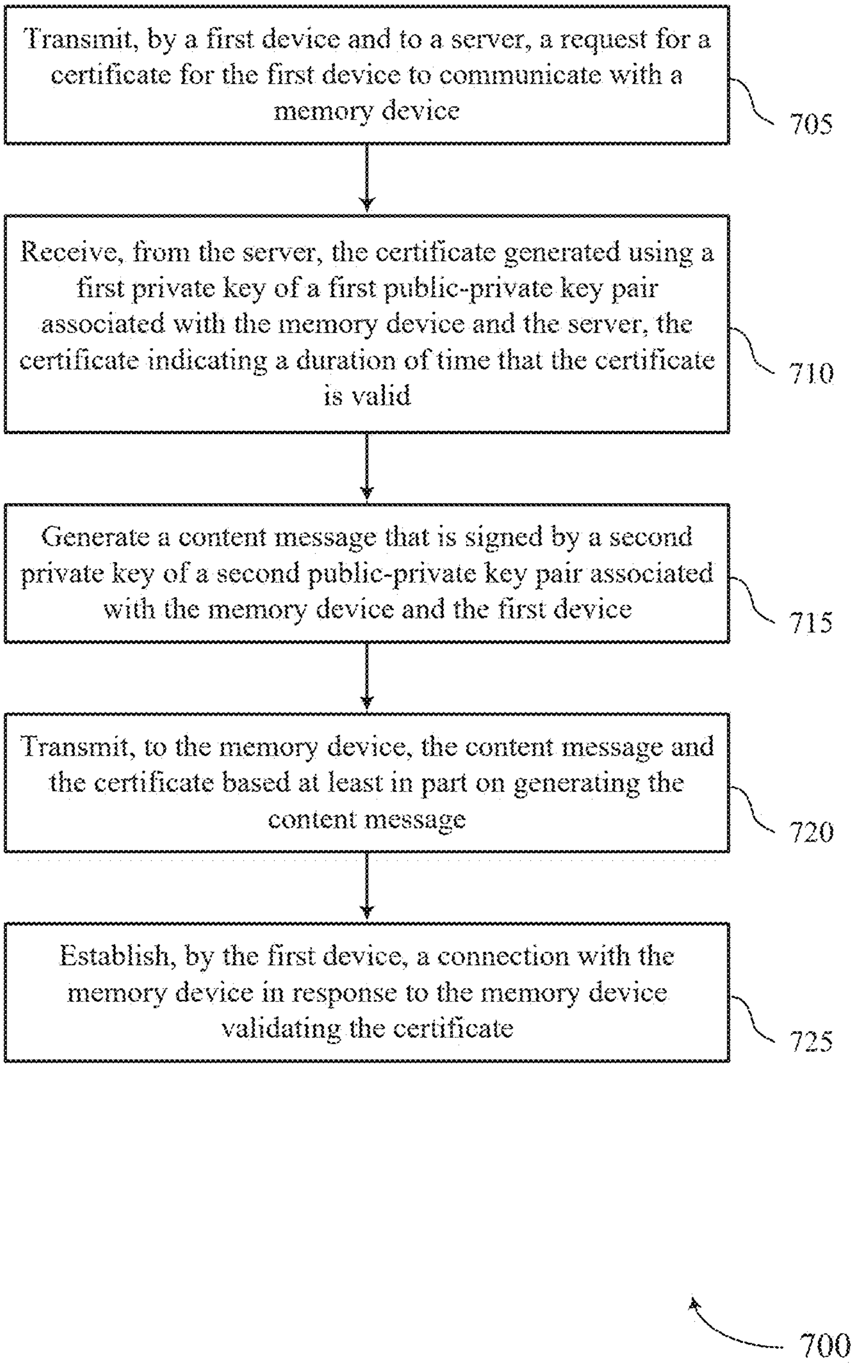
FIGS. 7 through 9 show flowcharts illustrating a method or methods that support sharing keys with authorized users in accordance with examples as disclosed herein.

FIG. 7 shows a flowchart illustrating a method 700 that supports sharing keys with authorized users in accordance with examples as disclosed herein. The operations of method 700 may be implemented by a first device or its components as described herein. For example, the operations of method 700 may be performed by a first device as described with reference to FIGS. 1 through 4. In some examples, a first device may execute a set of instructions to control the functional elements of the device to perform the described functions. Additionally or alternatively, the first device may perform aspects of the described functions using special-purpose hardware.

At 705, the method may include transmitting, by a first device and to a server, a request for a certificate for the first device to communicate with a memory device. The operations of 705 may be performed in accordance with examples as disclosed herein. In some examples, aspects of the operations of 705 may be performed by a request component 425 as described with reference to FIG. 4.

At 710, the method may include receiving, from the server, the certificate generated using a first private key of a first public-private key pair associated with the memory device and the server, the certificate indicating a duration of time that the certificate is valid. The operations of 710 may be performed in accordance with examples as disclosed herein. In some examples, aspects of the operations of 710 may be performed by a certificate component 430 as described with reference to FIG. 4.

At 715, the method may include generating a content message that is signed by a second private key of a second public-private key pair associated with the memory device and the first device. The operations of 715 may be performed in accordance with examples as disclosed herein. In some examples, aspects of the operations of 715 may be performed by a message component 435 as described with reference to FIG. 4.

At 720, the method may include transmitting, to the memory device, the content message and the certificate based at least in part on generating the content message. The operations of 720 may be performed in accordance with examples as disclosed herein. In some examples, aspects of the operations of 720 may be performed by a content transmitter 440 as described with reference to FIG. 4.

At 725, the method may include establishing, by the first device, a connection with the memory device in response to the memory device validating the certificate. The operations of 725 may be performed in accordance with examples as disclosed herein. In some examples, aspects of the operations of 725 may be performed by a connection component 445 as described with reference to FIG. 4.

In some examples, an apparatus as described herein may perform a method or methods, such as the method 700. The apparatus may include, features, circuitry, logic, means, or instructions (e.g., a non-transitory computer-readable medium storing instructions executable by a processor), or any combination thereof for performing the following aspects of the present disclosure:

Aspect 1: The apparatus, including features, circuitry, logic, means, or instructions, or any combination thereof for transmitting, by a first device and to a server, a request for a certificate for the first device to communicate with a memory device; receiving, from the server, the certificate generated using a first private key of a first public-private key pair associated with the memory device and the server, the certificate indicating a duration of time that the certificate is valid; generating a content message that is signed by a second private key of a second public-private key pair associated with the memory device and the first device; transmitting, to the memory device, the content message and the certificate based at least in part on generating the content message; and establishing, by the first device, a connection with the memory device in response to the memory device validating the certificate.

Aspect 2: The apparatus of aspect 1, further including operations, features, circuitry, logic, means, or instructions, or any combination thereof for generating the second public-private key pair including the second private key and a second public key, where transmitting the request for the certificate includes transmitting the second public key of the second public-private key pair, where the certificate includes the second public key.

Aspect 3: The apparatus of aspect 2, further including operations, features, circuitry, logic, means, or instructions, or any combination thereof for generating the request for the certificate based at least in part on generating the second public-private key pair, where transmitting the request for the certificate is based at least in part on generating the request for the certificate, where the request for the certificate includes the second public key.

Aspect 4: The apparatus of any of aspects 1 through 3, further including operations, features, circuitry, logic, means, or instructions, or any combination thereof for receiving, from the memory device, a message indicating an error associated with the certificate, where the error indicates that the certificate is invalid, absent, corrupt, or a combination thereof.

Aspect 5: The apparatus of aspect 4, further including operations, features, circuitry, logic, means, or instructions, or any combination thereof for transmitting, to the server, a request for an updated certificate based at least in part on receiving the message; receiving, from the server, the updated certificate generated using the first private key of the first public-private key pair; and transmitting, to the memory device, the updated certificate based at least in part on receiving the updated certificate.

Aspect 6: The apparatus of any of aspects 1 through 5, further including operations, features, circuitry, logic, means, or instructions, or any combination thereof for determining that the certificate is signed by the first private key of the first public-private key pair, where generating the content message is based at least in part on determining that the certificate is signed.

Aspect 7: The apparatus of any of aspects 1 through 6, further including operations, features, circuitry, logic, means, or instructions, or any combination thereof for the content message includes a firmware update, a software update, a boot image, a secure command, or a combination thereof.

Aspect 8: The apparatus of any of aspects 1 through 7, further including operations, features, circuitry, logic, means, or instructions, or any combination thereof for the certificate indicates the duration of time for access to the memory device.

Figure 8:
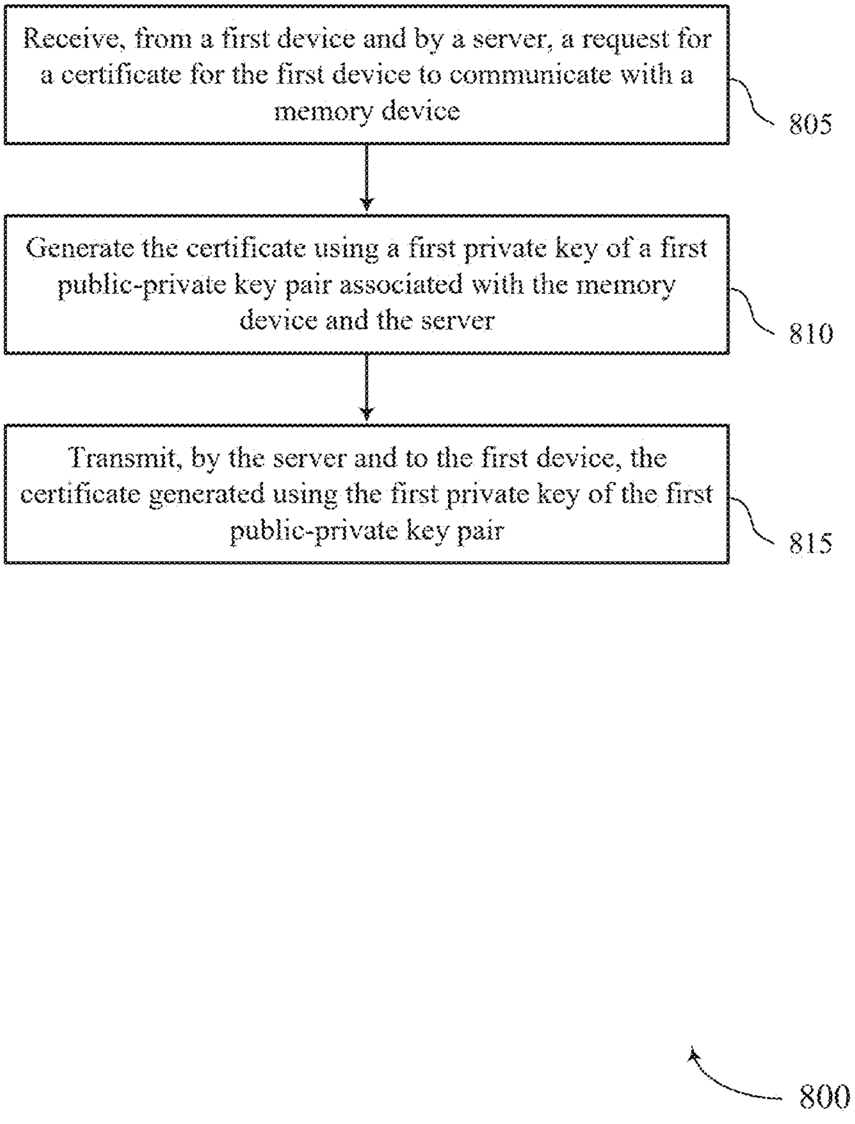

FIG. 8 shows a flowchart illustrating a method 800 that supports sharing keys with authorized users in accordance with examples as disclosed herein. The operations of method 800 may be implemented by a server or its components as described herein. For example, the operations of method 800 may be performed by a server as described with reference to FIGS. 1 through 2 and 5. In some examples, a server may execute a set of instructions to control the functional elements of the device to perform the described functions. Additionally or alternatively, the server may perform aspects of the described functions using special-purpose hardware.

At 805, the method may include receiving, from a first device and by a server, a request for a certificate for the first device to communicate with a memory device. The operations of 805 may be performed in accordance with examples as disclosed herein. In some examples, aspects of the operations of 805 may be performed by a request receiver 525 as described with reference to FIG. 5.

At 810, the method may include generating the certificate using a first private key of a first public-private key pair associated with the memory device and the server. The operations of 810 may be performed in accordance with examples as disclosed herein. In some examples, aspects of the operations of 810 may be performed by a certificate generator 530 as described with reference to FIG. 5.

At 815, the method may include transmitting, by the server and to the first device, the certificate generated using the first private key of the first public-private key pair. The operations of 815 may be performed in accordance with examples as disclosed herein. In some examples, aspects of the operations of 815 may be performed by a certificate transmitter 535 as described with reference to FIG. 5.

In some examples, an apparatus as described herein may perform a method or methods, such as the method 800. The apparatus may include, features, circuitry, logic, means, or instructions (e.g., a non-transitory computer-readable medium storing instructions executable by a processor), or any combination thereof for performing the following aspects of the present disclosure:

Aspect 9: The apparatus, including features, circuity, logic, means, or instructions, or any combination thereof for receiving, from a first device and by a server, a request for a certificate for the first device to communicate with a memory device; generating the certificate using a first private key of a first public-private key pair associated with the memory device and the server; and transmitting, by the server and to the first device, the certificate generated using the first private key of the first public-private key pair.

Aspect 10: The apparatus of aspect 9, further including operations, features, circuity, logic, means, or instructions, or any combination thereof for determining a duration of time that the certificate is valid based at least in part on receiving the request for the certificate, where generating the certificate is based at least in part on determining the duration of time that the certificate is valid.

Aspect 11: The apparatus of any of aspects 9 through 10, further including operations, features, circuity, logic, means, or instructions, or any combination thereof for determining a duration of time for access to the memory device based at least in part on receiving the request for the certificate, where generating the certificate is based at least in part on determining the duration of time for access to the memory device.

Aspect 12: The apparatus of aspect 11, further including operations, features, circuity, logic, means, or instructions, or any combination thereof for the certificate indicates the duration of time for access to the memory device.

Aspect 13: The apparatus of any of aspects 9 through 12, further including operations, features, circuity, logic, means, or instructions, or any combination thereof for receiving, as part of the request for the certificate, a second public key of a second public-private key pair generated by the first device, where generating the certificate is based at least in part on determining that the request for the certificate includes the second public key.

Aspect 14: The apparatus of aspect 13, further including operations, features, circuity, logic, means, or instructions, or any combination thereof for validating the second public key of the second public-private key pair based at least in part on receiving the second public key, where generating the certificate is based at least in part on validating the second public key of the second public-private key pair.

Aspect 15: The apparatus of any of aspects 13 through 14, further including operations, features, circuity, logic, means, or instructions, or any combination thereof for encoding the second public key of the second public-private key pair in the certificate based at least in part on receiving the second public key, where transmitting the certificate is based at least in part on encoding the second public key in the certificate.

Figure 9:
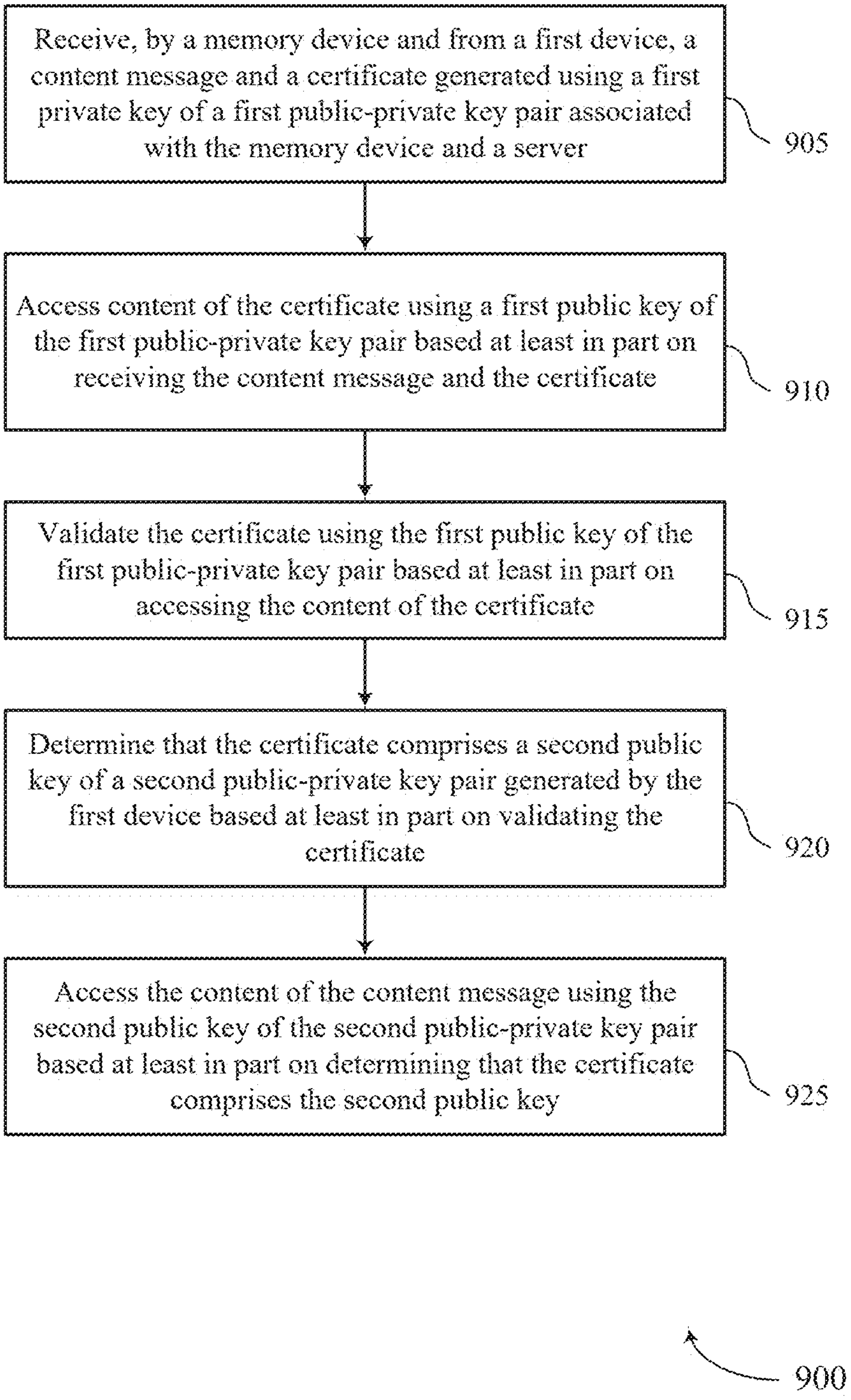

FIG. 9 shows a flowchart illustrating a method 900 that supports sharing keys with authorized users in accordance with examples as disclosed herein. The operations of method 900 may be implemented by a memory device or a memory system or its components as described herein. For example, the operations of method 900 may be performed by a memory device or a memory system as described with reference to FIGS. 1 through 2 and 6. In some examples, a memory device or a memory system may execute a set of instructions to control the functional elements of the device to perform the described functions. Additionally or alternatively, the memory device or a memory system may perform aspects of the described functions using special-purpose hardware.

At 905, the method may include receiving, by a memory device and from a first device, a content message and a certificate generated using a first private key of a first public-private key pair associated with the memory device and a server. The operations of 905 may be performed in accordance with examples as disclosed herein. In some examples, aspects of the operations of 905 may be performed by a content receiver 625 as described with reference to FIG. 6.

At 910, the method may include accessing content of the certificate using a first public key of the first public-private key pair based at least in part on receiving the content message and the certificate. The operations of 910 may be performed in accordance with examples as disclosed herein. In some examples, aspects of the operations of 910 may be performed by a certificate content component 630 as described with reference to FIG. 6.

At 915, the method may include validating the certificate using the first public key of the first public-private key pair based at least in part on accessing the content of the certificate. The operations of 915 may be performed in accordance with examples as disclosed herein. In some examples, aspects of the operations of 915 may be performed by a validation component 635 as described with reference to FIG. 6.

At 920, the method may include determining that the certificate includes a second public key of a second public-private key pair generated by the first device based at least in part on validating the certificate. The operations of 920 may be performed in accordance with examples as disclosed herein. In some examples, aspects of the operations of 920 may be performed by a key component 640 as described with reference to FIG. 6.

At 925, the method may include accessing the content of the content message using the second public key of the second public-private key pair based at least in part on determining that the certificate includes the second public key. The operations of 925 may be performed in accordance with examples as disclosed herein. In some examples, aspects of the operations of 925 may be performed by an access component 645 as described with reference to FIG. 6.

In some examples, an apparatus as described herein may perform a method or methods, such as the method 900. The apparatus may include, features, circuitry, logic, means, or instructions (e.g., a non-transitory computer-readable medium storing instructions executable by a processor), or any combination thereof for performing the following aspects of the present disclosure:

Aspect 16: The apparatus, including features, circuity, logic, means, or instructions, or any combination thereof for receiving, by a memory device and from a first device, a content message and a certificate generated using a first private key of a first public-private key pair associated with the memory device and a server; accessing content of the certificate using a first public key of the first public-private key pair based at least in part on receiving the content message and the certificate; validating the certificate using the first public key of the first public-private key pair based at least in part on accessing the content of the certificate;

determining that the certificate includes a second public key of a second public-private key pair generated by the first device based at least in part on validating the certificate; and accessing content of the content message using the second public key of the second public-private key pair based at least in part on determining that the certificate includes the second public key.

Aspect 17: The apparatus of aspect 16 where the certificate indicates a duration of time that the certificate is valid and the method, apparatuses, and non-transitory computer-readable medium, further includes operations, features, circuity, logic, means, or instructions, or any combination thereof for determining that the certificate is received during the duration of time that the certificate is valid based at least in part on receiving the content message and the certificate, where accessing the content is based at least in part on determining that that the certificate is received during the duration of time that the certificate is valid.

Aspect 18: The apparatus of any of aspects 16 through 17, further including operations, features, circuity, logic, means, or instructions, or any combination thereof for determining that the certificate is transmitted from the server based at least in part on receiving the certificate generated using the first private key of the first public-private key pair, where accessing the content of the certificate is based at least in part on determining that the certificate is transmitted from the server.

Aspect 19: The apparatus of any of aspects 16 through 18, further including operations, features, circuity, logic, means, or instructions, or any combination thereof for determining that the content message is signed by a second private key of the second public-private key pair, where accessing the content of the content message using the second public key is based at least in part on determining that the content message is signed by the second private key.

Aspect 20: The apparatus of any of aspects 16 through 19, further including operations, features, circuity, logic, means, or instructions, or any combination thereof for determining that the certificate is received during a duration of time for access to the memory device based at least in part on receiving the content message and the certificate, where accessing the content of the certificate is based at least in part on determining that the certificate is received during the duration of time for access to the memory device.

Aspect 21: The apparatus of any of aspects 16 through 20, further including operations, features, circuity, logic, means, or instructions, or any combination thereof for identifying an error associated with the certificate based at least in part on receiving the content message and the certificate and generating a message indicating the error associated with the certificate, where the error indicates that the certificate is invalid, absent, corrupt, or a combination thereof.

Aspect 22: The apparatus of aspect 21, further including operations, features, circuity, logic, means, or instructions, or any combination thereof for transmitting, to the first device, the message indicating the error based at least in part on generating the message and receiving an updated certificate generated by the server based at least in part transmitting the message indicating the error, where accessing the content of the certificate is based at least in part on receiving the updated certificate.

Aspect 23: The apparatus of any of aspects 16 through 22, further including operations, features, circuity, logic, means, or instructions, or any combination thereof for performing an access operation on one or more memory arrays of the memory device based at least in part on accessing the content of the content message.

Aspect 24: The apparatus of any of aspects 16 through 23, further including operations, features, circuity, logic, means, or instructions, or any combination thereof for the content message includes a firmware update, a software update, a boot image, a secure command, or a combination thereof.

Aspect 25: The apparatus of any of aspects 16 through 24, further including operations, features, circuity, logic, means, or instructions, or any combination thereof for the first public key of the first public-private key pair is stored in the memory device during manufacturing and is inaccessible to one or more components of the memory device.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

receiving, by a memory device and from a first device, a content message and a certificate generated using a first private key of a first public-private key pair associated with the memory device and a server;

accessing content of the certificate using a first public key of the first public-private key pair based at least in part on receiving the content message and the certificate;

validating the certificate using the first public key of the first public-private key pair based at least in part on accessing the content of the certificate; and accessing content of the content message using a second public key of a second public-private key pair generated by the first device based at least in part on validating the certificate, wherein the certificate comprises the second public key.

2. The method of claim 1, wherein the certificate indicates a duration of time that the certificate is valid, the method further comprising:

determining that the certificate is received during the duration of time that the certificate is valid based at least in part on receiving the content message and the certificate, wherein accessing the content of the certificate is based at least in part on determining that the certificate is received during the duration of time that the certificate is valid.

3. The method of claim 1, further comprising:

determining that the certificate is transmitted from the server based at least in part on receiving the certificate generated using the first private key of the first public-private key pair, wherein accessing the content of the certificate is based at least in part on determining that the certificate is transmitted from the server.

4. The method of claim 1, further comprising:

determining that the content message is signed by a second private key of the second public-private key pair, wherein accessing the content of the content message using the second public key is based at least in part on determining that the content message is signed by the second private key.

5. The method of claim 1, further comprising:

determining that the certificate is received during a duration of time for access to the memory device based at least in part on receiving the content message and the certificate, wherein accessing the content of the certificate is based at least in part on determining that the certificate is received during the duration of time for access to the memory device.

6. The method of claim 1, further comprising:

identifying an error associated with the certificate based at least in part on receiving the content message and the certificate; and generating a message indicating the error associated with the certificate, wherein the error indicates that the certificate is invalid, absent, corrupt, or a combination thereof.

7. The method of claim 1, further comprising:

performing an access operation on one or more memory arrays of the memory device based at least in part on accessing the content of the content message.

8. The method of claim 1, wherein the content message comprises a firmware update, a software update, a boot image, a secure command, or a combination thereof.

9. The method of claim 1, wherein the first public key of the first public-private key pair is stored in the memory device during manufacturing and is inaccessible to one or more components of the memory device.

10. A memory system, comprising:

one or more memory devices; and processing circuitry coupled with the one or more memory devices and configured to cause the memory system to:

receive, by a memory device of the one or more memory devices and from a first device, a content message and a certificate generated using a first private key of a first public-private key pair associated with the memory device and a server;

access content of the certificate using a first public key of the first public-private key pair based at least in part on receiving the content message and the certificate;

validate the certificate using the first public key of the first public-private key pair based at least in part on accessing the content of the certificate;

determine that the certificate comprises a second public key of a second public-private key pair generated by the first device based at least in part on validating the certificate; and access content of the content message using the second public key of the second public-private key pair based at least in part on determining that the certificate comprises the second public key.

11. The memory system of claim 10, wherein the certificate indicates a duration of time that the certificate is valid and wherein the processing circuitry is further configured to cause the memory system to:

determine that the certificate is received during the duration of time that the certificate is valid based at least in part on receiving the content message and the certificate, wherein accessing the content of the certificate is based at least in part on determining that the certificate is received during the duration of time that the certificate is valid.

12. The memory system of claim 10, wherein the processing circuitry is further configured to cause the memory system to:

determine that the certificate is transmitted from the server based at least in part on receiving the certificate generated using the first private key of the first public-private key pair, wherein accessing the content of the certificate is based at least in part on determining that the certificate is transmitted from the server.

13. The memory system of claim 10, wherein the processing circuitry is further configured to cause the memory system to:

determine that the content message is signed by a second private key of the second public-private key pair, wherein accessing the content of the content message using the second public key is based at least in part on determining that the content message is signed by the second private key.

14. The memory system of claim 10, wherein the processing circuitry is further configured to cause the memory system to:

determine that the certificate is received during a duration of time for access to the memory device based at least in part on receiving the content message and the certificate, wherein accessing the content of the certificate is based at least in part on determining that the certificate is received during the duration of time for access to the memory device.

15. The memory system of claim 10, wherein the processing circuitry is further configured to cause the memory system to:

identify an error associated with the certificate based at least in part on receiving the content message and the certificate; and generate a message indicating the error associated with the certificate, wherein the error indicates that the certificate is invalid, absent, corrupt, or a combination thereof.

16. The memory system of claim 10, wherein the processing circuitry is further configured to cause the memory system to:

perform an access operation on one or more memory arrays of the memory device based at least in part on accessing the content of the content message.

17. The memory system of claim 10, wherein the content message comprises a firmware update, a software update, a boot image, a secure command, or a combination thereof.

18. The memory system of claim 10, wherein the first public key of the first public-private key pair is stored in the memory device during manufacturing and is inaccessible to one or more components of the memory device.

19. A non-transitory computer-readable medium storing code comprising instructions which, when executed by processing circuitry of an electronic device, cause the electronic device to:

receive, by a memory device and from a first device, a content message and a certificate generated using a first private key of a first public-private key pair associated with the memory device and a server, wherein the certificate indicates a duration of time that the certificate is valid;

access, based at least in part on the duration of time, content of the certificate using a first public key of the first public-private key pair based at least in part on receiving the content message and the certificate;

validate the certificate using the first public key of the first public-private key pair based at least in part on accessing the content of the certificate;

determine that the certificate comprises a second public key of a second public-private key pair generated by the first device based at least in part on validating the certificate; and access content of the content message using the second public key of the second public-private key pair based at least in part on determining that the certificate comprises the second public key.

20. The non-transitory computer-readable medium of claim 19, wherein the instructions are further executable by the processing circuitry to:

determine that the certificate is received during the duration of time that the certificate is valid based at least in part on receiving the content message and the certificate, wherein accessing the content of the certificate is based at least in part on determining that the certificate is received during the duration of time that the certificate is valid.

* * * * *